United States Patent
Mestery et al.

(10) Patent No.: US 12,058,051 B2
(45) Date of Patent: Aug. 6, 2024

(54) FLOW PARSER AND PER FLOW DATA CENTER UTILIZATION IN A CLOUD-BASED SECURE ACCESS SERVICE ENVIRONMENT

(71) Applicant: Cisco Technology, Inc., San Jose, CA (US)

(72) Inventors: Kyle Andrew Donald Mestery, Woodbury, MN (US); Mark A. Bakke, Maple Grove, MN (US); William Mark Townsley, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 17/678,866

(22) Filed: Feb. 23, 2022

(65) Prior Publication Data

US 2023/0269191 A1    Aug. 24, 2023

(51) Int. Cl.
*H04L 47/2441* (2022.01)
*H04L 9/40* (2022.01)
*H04L 61/5007* (2022.01)

(52) U.S. Cl.
CPC ...... *H04L 47/2441* (2013.01); *H04L 61/5007* (2022.05); *H04L 63/02* (2013.01)

(58) Field of Classification Search
CPC . H04L 47/2441; H04L 61/5007; H04L 63/02; H04L 63/0209; H04L 63/0218; H04L 63/0227; H04L 63/0263; H04L 63/0272; H04L 63/029; H04L 63/0428
See application file for complete search history.

(56) References Cited

U.S. PATENT DOCUMENTS

| | | | | |
|---|---|---|---|---|
| 11,375,005 | B1* | 6/2022 | Rolando | H04L 45/22 |
| 11,741,238 | B2* | 8/2023 | Rioux | G06F 21/54 |
| | | | | 726/23 |
| 2015/0326533 | A1* | 11/2015 | Lopez | H04L 63/0218 |
| | | | | 726/11 |
| 2017/0005790 | A1* | 1/2017 | Brockmann | H04L 9/3234 |
| 2017/0324714 | A1* | 11/2017 | Wainner | H04L 63/0272 |
| 2018/0063085 | A1* | 3/2018 | Shanks | H04L 63/1408 |
| 2018/0115525 | A1* | 4/2018 | Chou | H04L 67/568 |
| 2019/0075483 | A1* | 3/2019 | Cao | H04W 28/0268 |
| 2019/0268421 | A1* | 8/2019 | Markuze | H04L 67/10 |
| 2019/0297057 | A1* | 9/2019 | Raney | H04L 41/0894 |
| 2021/0076299 | A1* | 3/2021 | Chunduri | H04W 36/02 |
| 2021/0336934 | A1* | 10/2021 | Deshmukh | H04L 63/105 |
| 2022/0131767 | A1* | 4/2022 | Manthena | H04L 43/16 |

(Continued)

*Primary Examiner* — Benjamin H Elliott, IV
(74) *Attorney, Agent, or Firm* — Polsinelli P.C.

(57) ABSTRACT

The present disclosure is directed to network traffic management and load balancing at a cloud-based secure access service accessible to remotely connected user devices. In one example, a cloud-based secure service system includes a network controller configured to receive network traffic from one or more user devices remotely connected to the controller; parse the network traffic into flow data and contextual information associated with the network traffic; determine that the network traffic is to be serviced by a target firewall service at the cloud-based secure service system based on the flow data and the contextual information; and direct the network traffic to the target firewall service to be serviced.

20 Claims, 9 Drawing Sheets

(56) References Cited

U.S. PATENT DOCUMENTS

| | | | | |
|---|---|---|---|---|
| 2022/0345495 A1* | 10/2022 | Ravi | .................. | H04L 63/0236 |
| 2022/0345500 A1* | 10/2022 | Ravi | .................. | H04L 63/1466 |
| 2023/0019448 A1* | 1/2023 | Deshmukh | .......... | H04L 63/1433 |
| 2023/0229479 A1* | 7/2023 | Sharma | ............... | G06F 9/45558 |
| | | | | 718/1 |
| 2023/0269191 A1* | 8/2023 | Mestery | .............. | H04L 63/0263 |
| | | | | 370/235 |

* cited by examiner

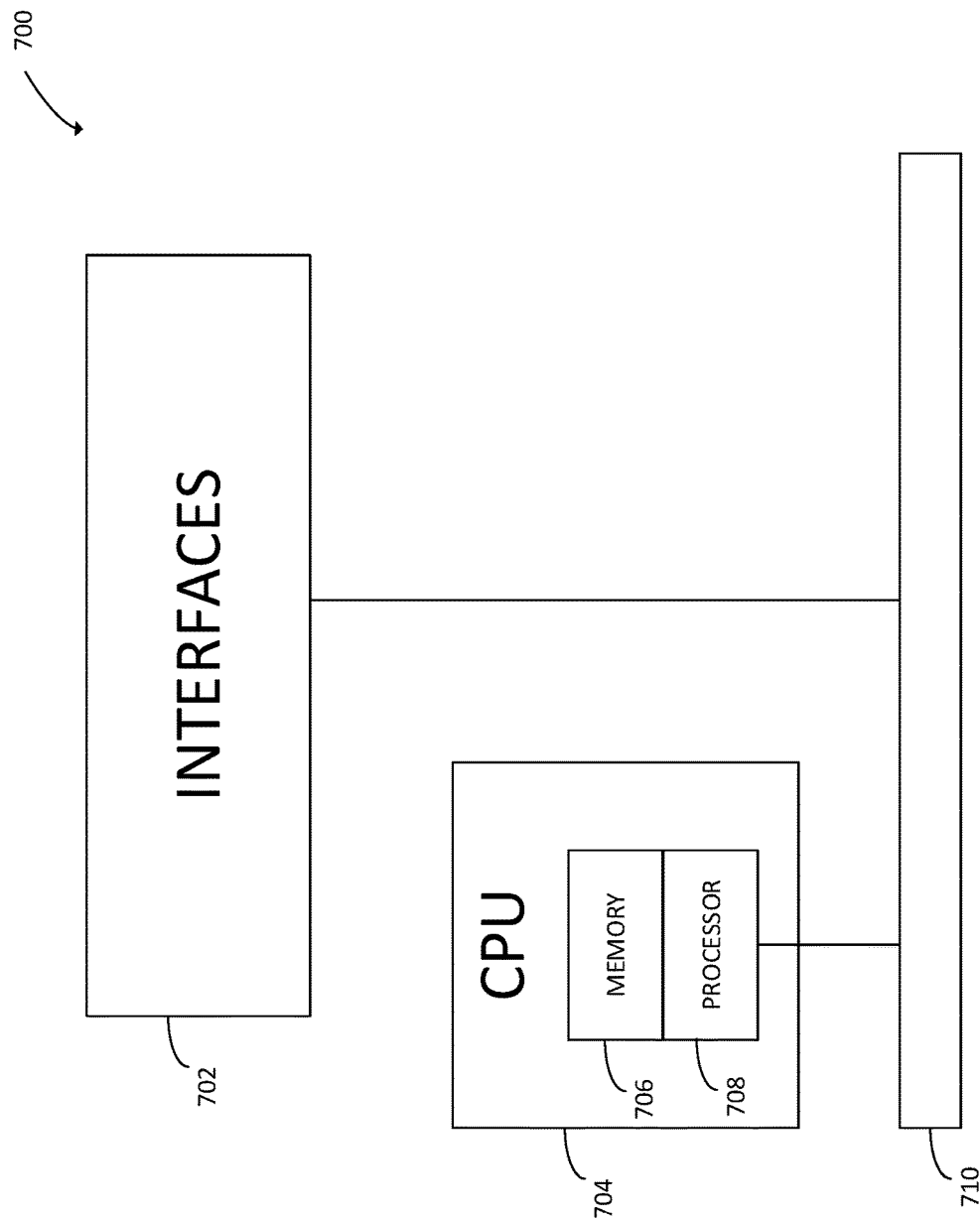

FLOW PARSER AND PER FLOW DATA CENTER UTILIZATION IN A CLOUD-BASED SECURE ACCESS SERVICE ENVIRONMENT

TECHNICAL FIELD

The present technology pertains to addressing security of wireless networks, and in particular to network traffic management at a cloud-based secure access service accessible to remotely connected user devices.

BACKGROUND

Secure Access Service Edge (SASE) combines networking and security functions in the cloud to deliver seamless, secure access to applications, anywhere users work. Example functionalities provided by SASE include, but are not limited to, software-defined wide area network, secure web gateway, firewall as a service, cloud access security broker, and zero-trust network access. The SASE model aims to consolidate these functions in a single, integrated cloud service.

As the number of connected user devices to a SASE service increases, so do challenges of maintaining delivery of reliable services to remotely connected user devices in a timely fashion.

BRIEF DESCRIPTION OF THE DRAWINGS

FIG. 7 illustrates an example network device, according to some aspects of the present disclosure.

DETAILED DESCRIPTION

Figure 1:
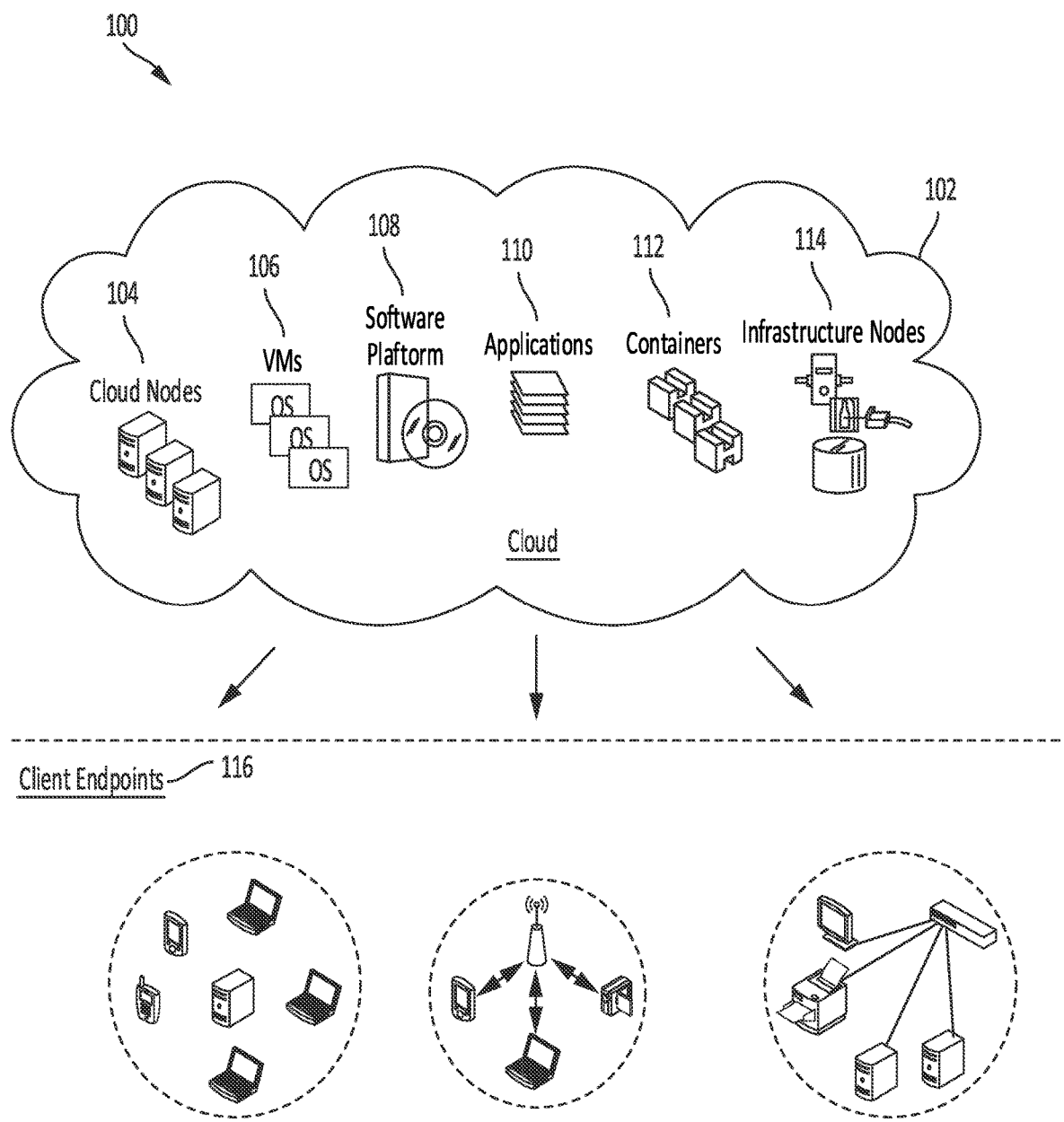
FIG. 1 illustrates an example cloud computing architecture, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Systems, methods, and computer-readable media are disclosed for managing network traffic (transmission of data packets) in a cloud-based service that remotely connects endpoints using a Secure Access Service Edge (SASE) architecture. In some aspects, incoming network traffic may be parsed at a controller of a SASE architecture, metadata of the network traffic may be analyzed and the network traffic may be routed to a component of the SASE controller for further processing. In one or more examples, SASE controller may perform load balancing between one or more local firewall services (e.g., in the same data center) for servicing the network traffic and/or redirecting the network traffic including any subsequent network traffic to one or more firewall services at another data center for processing.

In one example, a cloud-based secure service system includes a network controller configured to receive network traffic from one or more user devices remotely connected to the network controller; parse the network traffic into flow data and contextual information associated with the network traffic; determine that the network traffic is to be serviced by a target firewall service at the cloud-based secure service system based on the flow data and the contextual information; and direct the network traffic to the target firewall service to be serviced.

In another example, the network controller is configured to determine the target firewall service based on available processing capacity of a plurality of firewall services.

In another example, the flow data includes a source IP address, a source port, a destination IP address, a destination port, and a protocol type associated with the network traffic.

In another example, the contextual information includes a class of services, an origin of packets in the flow, and a tunnel ID associated with the network traffic.

In another example, the target firewall service is at a backup data center than a data center in which the network controller is located.

In another example, the network controller is further configured to transmit a message including the flow data and the contextual information to a corresponding one of the one or more user devices to redirect associated outgoing traffic to the backup data center for processing.

In another example, the network controller comprises a headend component that is configured to receive the network traffic.

In another example, the headend component comprises a flow parser module configured to parse the network traffic, the flow parser being inside the headend component and between an encryption/decryption module and a routing component of the cloud-based secure service system.

In one example, a method includes receiving, at a network controller of a cloud-based secure service system, network traffic from one or more user devices remotely connected to the network controller; parsing, by the network controller, the network traffic into flow data and contextual information associated with the flow; determining, by the network controller, that the flow is to be serviced by a target firewall service at the cloud-based secure service system based on the flow data and the contextual information; and directing, by the network controller, the network traffic to the target firewall service to be serviced.

In one example, one or more non-transitory computer-readable media include computer-readable instructions, which when executed by one or more processors at a network controller of a cloud-based secure service system, cause the network controller to receive network traffic from one or more user devices remotely connected to the network controller; parse the network traffic into flow data and contextual information associated with the flow; determine that the flow is to be serviced by a target firewall service at the cloud-based secure service system based on the flow data and the contextual information; and direct the network traffic to the target firewall service to be serviced.

Example Embodiments

With remote access to cloud services becoming ever more prevalent, there is a need for organization to reduce their dependency and expenditure on purchasing equipment and configuring them to service the remote access need of their customers and employees. A cloud-based Secure Access Service (SASE) is a serviced based system that addresses this need. As noted above, a SASE service combines networking and security functions in the cloud to deliver seamless, secure access to applications, anywhere users work. Example functionalities provided by SASE include, but are not limited to, software-defined wide area network, secure web gateway, firewall as a service, cloud access security broker, and zero-trust network access. The SASE model aims to consolidate these functions in a single, integrated cloud service.

As the number of connected user devices to a SASE service increases, so do challenges of maintaining delivery of reliable services to remotely connected user devices in a timely fashion. There is a need for improving cloud resource utilization and optimization of network performance. This need can be important to a cloud-based SASE services (e.g., Frontizo developed by Cisco, Inc. of San Jose, CA) as it serves to mesh and stitch together a number of different Software-Defined Wide Area Networks (SDWANs) and connected devices and provide access to public/private cloud-based services to such connected devices. Aspects of the present disclosure improve cloud resource utilization in a SASE environment by parsing incoming flow of network traffic to more efficiently route the network traffic to an intended destination in the SASE environment before eventually routing the same to an external service. In one or more examples, improvement in the cloud resource utilization can including load balancing and servicing the network traffic at one or more local firewall services and/or redirecting the network traffic to firewall services at one or more additional data centers.

The present disclosure provides systems and methods for managing network traffic (transmission of data packets) in a cloud-based service that remotely connects endpoints using a Secure Access Service Edge (SASE) architecture. In some aspects, incoming network traffic may be parsed at a controller of a SASE architecture, metadata of the network traffic may be analyzed and the network traffic may be routed to a component of the SASE controller for further processing. In one or more examples, SASE controller may perform load balancing between one or more local firewall services (e.g., in the same data center) for servicing the network traffic and/or redirecting the network traffic including any subsequent network traffic to one or more firewall services at another data center for processing.

Figure 2:
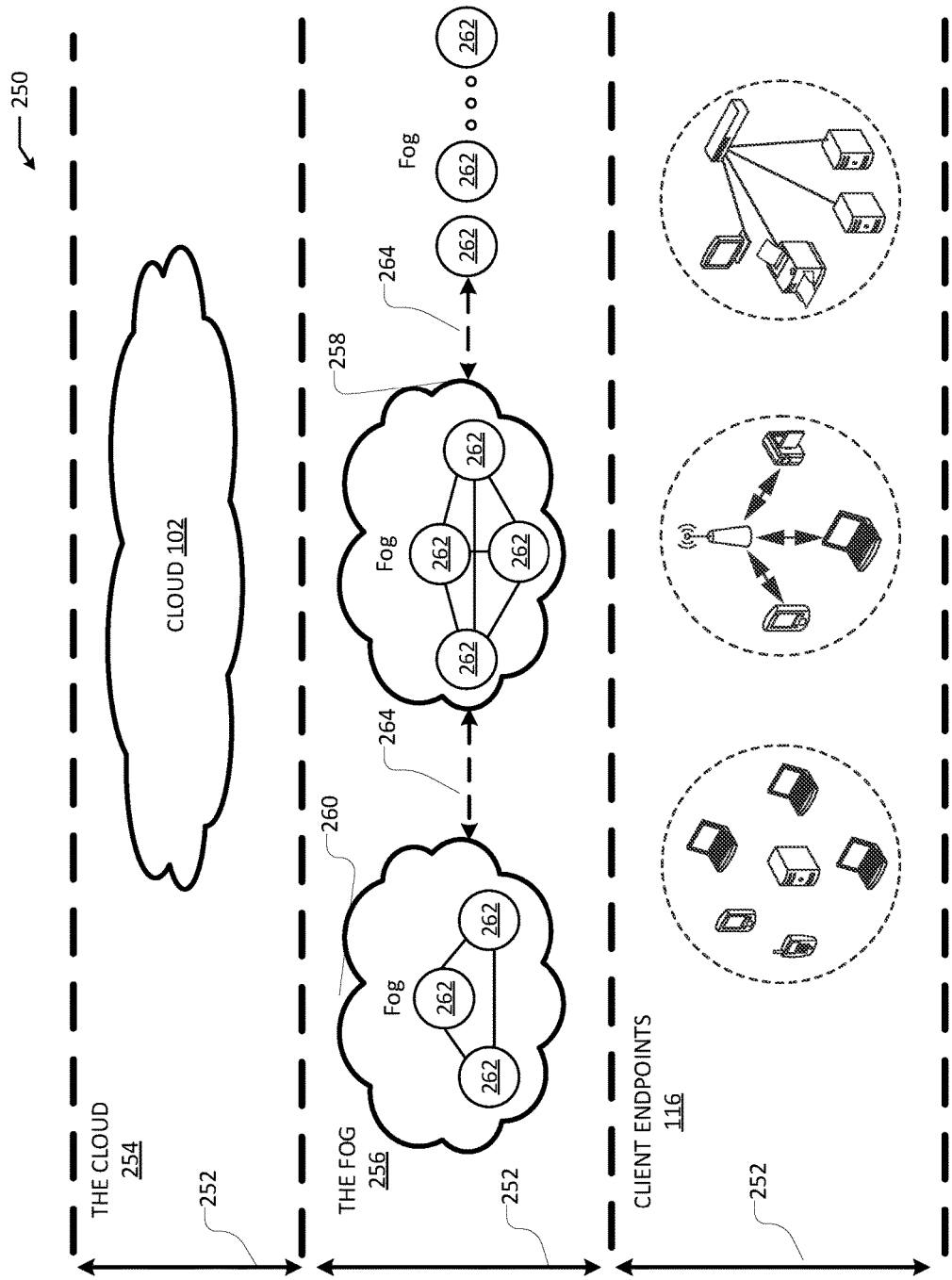
FIG. 2 illustrates an example fog computing architecture, according to some aspects of the present disclosure.

A description of example network environments and architectures for network data access and services, as illustrated in FIGS. 1 and 2, is first disclosed herein. One or more examples of a SASE based architecture are described with reference to FIGS. 3 and 4A-B. Example processes for managing network traffic in a SASE based environment in described next with reference to FIGS. 5A-B. The discussion then concludes with a brief description of example devices, as illustrated in FIGS. 6 and 7.

FIG. 1 illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 2 illustrates a diagram of an example fog computing architecture 250. The fog computing architecture 250 can include the cloud layer 254, which includes the cloud 102 of FIG. 1 and any other cloud system or environment, and the fog layer 256, which includes fog nodes 262. The client endpoints 116 (same as in FIG. 1) can communicate with the cloud layer 254 and/or the fog layer 256. The architecture 250 can include one or more communication links 252 between the cloud layer 254, the fog layer 256, and the client endpoints 116. Communications can flow up to the cloud layer 154 and/or down to the client endpoints 116.

The fog layer 256 or "the fog" provides the computation, storage and networking capabilities of traditional cloud networks, but closer to the endpoints. The fog can thus extend the cloud 102 to be closer to the client endpoints 216. The fog nodes 262 can be the physical implementation of fog networks. Moreover, the fog nodes 262 can provide local or regional services and/or connectivity to the client endpoints 116. As a result, traffic and/or data can be offloaded from the cloud 102 to the fog layer 256 (e.g., via fog nodes 262). The fog layer 256 can thus provide faster services and/or connectivity to the client endpoints 116, with lower latency, as well as other advantages such as security benefits from keeping the data inside the local or regional network(s).

The fog nodes 262 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 262 can be deployed within fog instances 258, 260. The fog instances 258, 258 can be local or regional clouds or networks. For example, the fog instances 256, 258 can be a regional cloud or data center, a local area network, a network of fog nodes 262, etc. In some configurations, one or more fog nodes 262 can be deployed within a network, or as standalone or individual nodes, for example. Moreover, one or more of the fog nodes 262 can be interconnected with each other via links 264 in various topologies, including star, ring, mesh or hierarchical arrangements, for example.

In some cases, one or more fog nodes 262 can be mobile fog nodes. The mobile fog nodes can move to different geographical locations, logical locations or networks, and/or fog instances while maintaining connectivity with the cloud layer 254 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 254 while located at the starting location and switch to a different physical and/or logical connection point with the cloud 254 while located at the destination location. The particular fog node can thus move within particular clouds and/or fog instances and, therefore, serve endpoints from different locations at different times.

Figure 3:
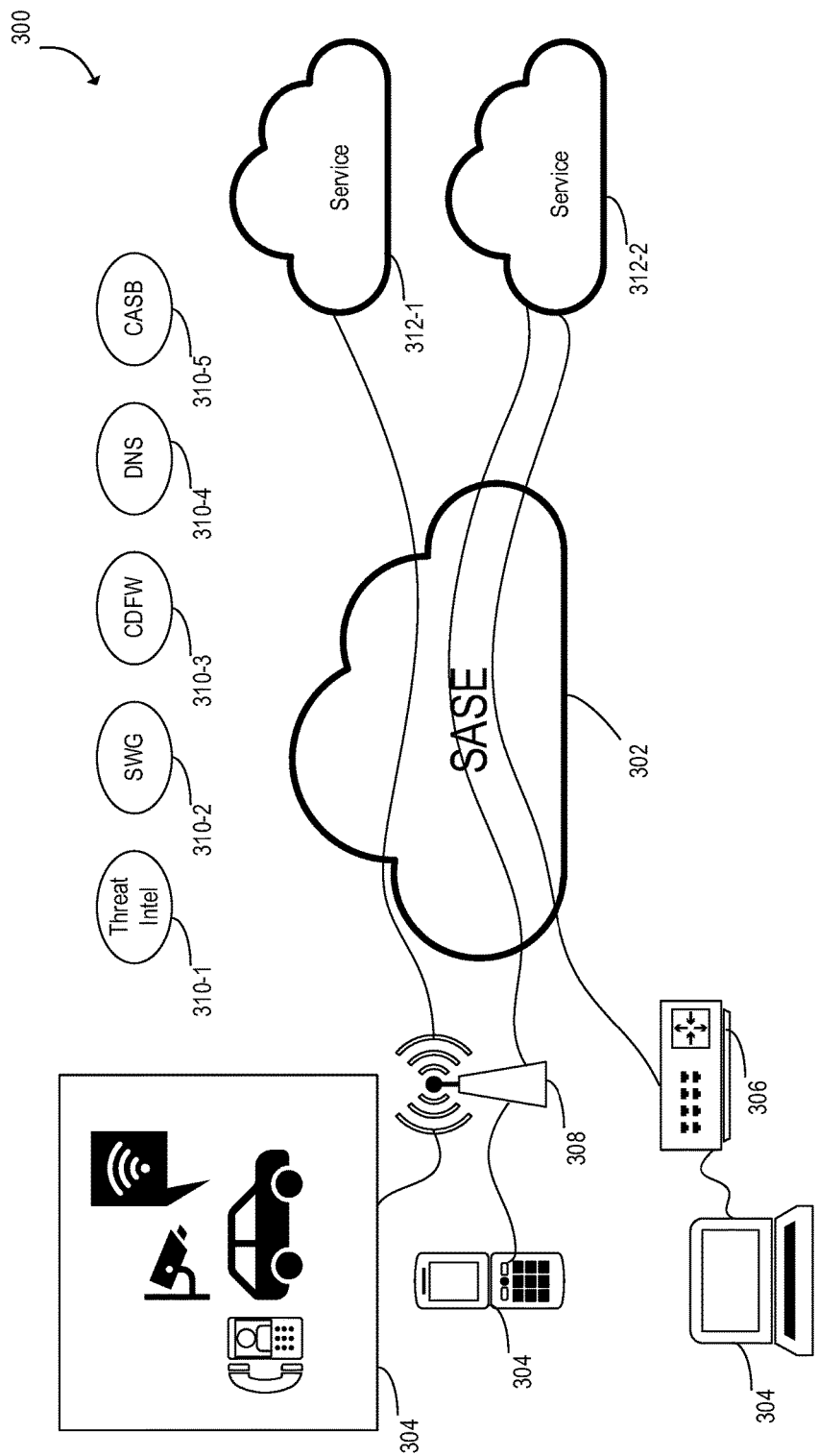
FIG. 3 illustrates an example SASE based architecture, according to some aspects of the present disclosure.

FIG. 3 illustrates an example SASE based architecture, according to some aspects of the present disclosure. A SASE based architecture 100 of FIG. 3 includes a SASE controller 302. SASE controller 302 may be a cloud-based component residing on one or more decentralized or centralized servers and communicatively coupled to any number of network devices, servers, etc., including user devices 304, services 312-1 and 312-2, etc. Controller 302 may be a software-defined network such as that described above with reference to FIGS. 1 and 2. Components of controller 302 may include one or more cloud-based headends, one or more CDFW, one or more routers, etc., all of which will be described in more detail with reference to FIG. 4.

Architecture 300 further includes user devices 304 that may remotely connect to controller 302 via any known or to be developed Virtual Private Network (VPN) connection including, but not limited to, Point-to-Point Tunneling Protocol (PPTP), Layer 2 Tunneling Protocol (L2TP), Internet Protocol Security (IPSec), Secure Sockets Layer (SSL), Internet Key Exchange Version 2 (IKEv2), etc.

User devices 304 can be any type of known or to be developed device capable of remotely accessing one or more of services 312-1 and 312-2 via controller 302. For example, user devices 304 can include a laptop, a mobile device, Internet of Things (IoT) devices, a router, a server, etc. User devices 304 may be the same as client endpoints 116 of FIG. 1.

Each user device 304 may connect to controller 302 via a corresponding access point such as access point 306, 308, etc. SASE services provided by controller 302 may include, but are not limited to, security services such as threat intelligence service 310-1, Secure Web Gateway (SWG) service 310-2, CDFW 310-3, Domain Name Services (DNS) 310-4, Cloud Access Security Broker (CASB) services 310-5, etc.

Any one or more of user devices 304 may access any one or more services 312-1 and/or 312-2. Services 312-1 and/or services 312-2 may be private cloud-based services provided by operator of controller 302, a third-party cloud-based services, a public cloud-based services, and/or a hybrid of the same. For example, a private cloud-based service can be an enterprise 5G services. An example of a third-party cloud-based service can be a cloud-storage service (e.g., Google cloud storage), a cloud-based computing services provided by Amazon, Microsoft, Google, Facebook, etc.

Figure 4A:
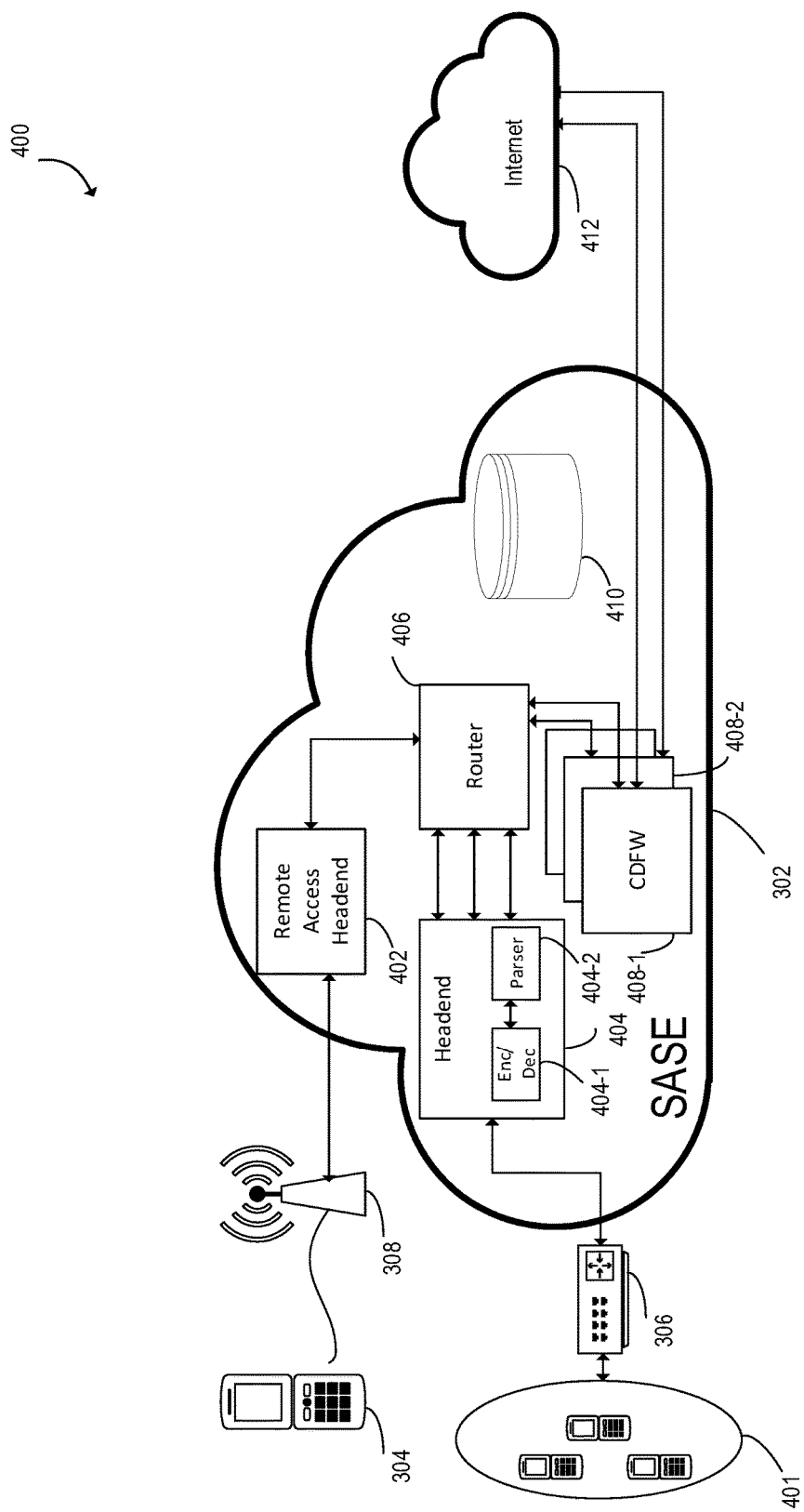
FIG. 4A illustrates an example flow parsing operation in SASE based architecture of FIG. 3, according to some aspects of the present disclosure.

FIG. 4A illustrates an example flow parsing operation in SASE based architecture of FIG. 3, according to some aspects of the present disclosure. In describing FIG. 4A, the elements and components that are the same as those described above with reference to FIG. 3 have the same reference numerals in FIG. 4A.

In architecture 400, a user device 304 may access controller 302 via access point 308 and establishing a VPN connection to one of remote access headends 402 or 404, depending on the type of VPN connection and the VPN agent installed on user device 304. For example, user device 304 may have a client-based VPN connection agent installed thereon and can thus establish connection over an IPSec tunnel to remote access headend 402. In another example, a group of user devices 401 may be connected to a router such as a Meraki MX router and thus may establish a connection to a Meraki headend (e.g., headend 404) to access services of controller 102. In some examples, any given type of supported VPN connection may have its own headend component on controller 102 for establishing a connection to the corresponding user device 304.

Each remote access headend may have corresponding encryption/decryption components, a flow processor, etc. Such components may include any known or to be developed encryption/decryption components, a flow processor, etc.

Architecture 400 illustrates headend 404 as having an encryption/decryption component 404-1 and parser 404-2 for parsing incoming data flows and directing them to one or more fire wall services for processing, as will be described below. However, any other type of headend inside controller 302, including remote access headend 402 may include similar encryption/decryption and parser components, even though components are not shown in FIG. 4A with respect to remote access headend 402.

Once network traffic is received at remote access headend 402 or 404, the network traffic is decrypted (as it is sent in an encrypted form to controller 302) using encryption/decryption component 404-1 and then analyzed and parsed by parser 404-2. In one example and as shown in FIG. 4A, parser 404-2 may sit between encryption/decryption component 404-1 and router 406. In one or more examples, parser 404-2 can extract a variety of metadata from the incoming flow received (e.g., from user devices 401). For example, parser 404-2 can determine the destination of the flow (e.g., whether it is going to a routing component such as router 406, to CDFW 408-1 or 408-2, etc.). Metadata (which may include flow data and contextual data as will be referenced with respect to the description of FIGS. 5A and 5B below) can further include information such as the size and type of the data, a service level agreement associated with the data that may determine the type and/or priority for processing the data, etc.

After being parsed, the data packets of the flow may be forwarded to the intended destination inside controller 302, processed accordingly, and/or forwarded thereby to an external destination via internet 412.

In some examples, the metadata extracted from an incoming flow by parser 404-2 may be shared with router 406, CDFWs 408-1, 408-2, etc. to more efficiently route the network traffic. For instance, an incoming flow from one or more user devices 401 may be parsed by parser 404-2, where parser 404-2 may determine that they need to be sent to a CDFW. This information may be shared with router 406.

Router 406 may perform any known or to be developed functionalities for routing network traffic to corresponding components for servicing the traffic inside controller 302 and/or alternatively route network traffic to its destination. Router 406, having information about utilization of various CDFWs such as CDFW 408-1 and CDFW 408-2, may identify any over-utilized or under-utilized CDFW and thus can perform load balancing to optimize utilization of CDFW services inside controller 302. Accordingly, router 406, using the extracted metadata of a flow provided by parser 404-2, can direct the incoming flow to a CDFW that is under-utilized to most efficiently utilize and service incoming network traffic. In some instances, all existing CDFWs may be performing at capacity, servicing other network traffics from other remotely connected devices. As will be described below with reference to FIG. 4B, one solution is to route the network traffic to another datacenter (e.g., another controller) with available CDFW services for servicing the network traffic. In another instance, controller 302 may spin up additional on-demand CDFWs inside controller 302 for servicing the incoming network traffic.

Router 406 then forwards the received network traffic to one or more CDFWs 408 (e.g., CDFW 408-1 or CDFW 408-2). CDFW 408-1 or CDFW 408-2 may then apply any applicable network policy to the received network traffic to determine if the network traffic should be dropped, is authorized to utilize services of controller 302, is authorized to access a requested external service (e.g., one of services 312-1 or 312-2), etc. Such network policies may be configured according to a service level agreement (SLA) between operator(s) of user devices 304 or 401 and provider of controller 302.

In some examples, controller 302 may have one or more associated databases 410. Overtime and as network policies for a given user device 304 (or a family of user devices) change and corresponding decisions are made for allowing/dropping packets, such policies (rules) may be stored in database 410. When user device 304 is detected to come online after a period of inactivity or when user device 304 is the same as another online device with the same network policies applicable thereto, then controller 302, via CDFW 408 can pro-actively signal user device 304 to not send any network traffic to controller 302 (e.g., until further notice) because the history of previously applied rules to user device 304 or devices that are the same as user device 304 may indicate that network traffic originating from user device 304 should be dropped.

Figure 4B:
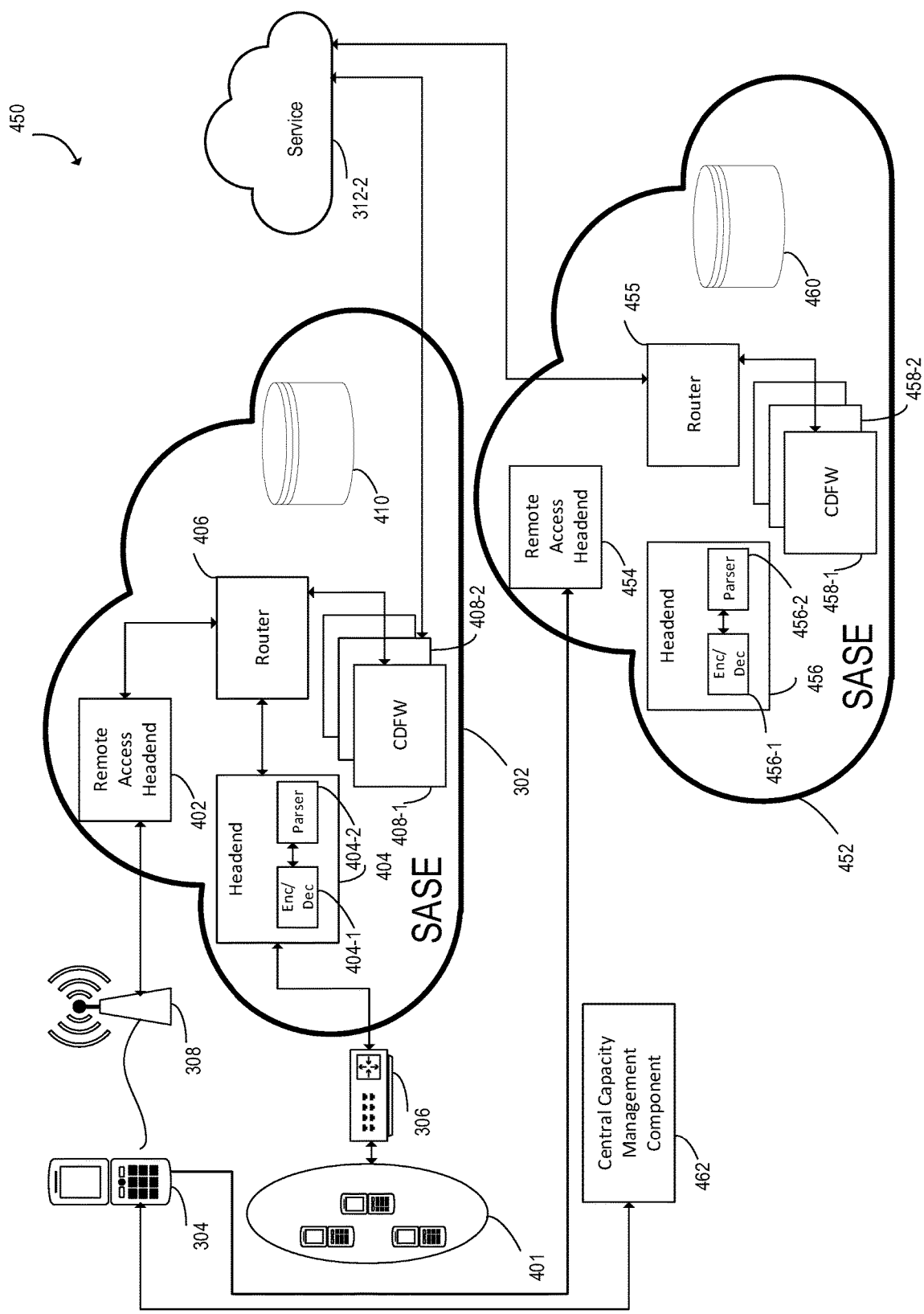
FIG. 4B illustrates an example flow parsing operation in SASE based architecture of FIG. 3, according to some aspects of the present disclosure.

FIG. 4B illustrates an example flow parsing operation in SASE based architecture of FIG. 3, according to some aspects of the present disclosure. In describing FIG. 4B, the elements and components that are the same as those described above with reference to FIG. 3 and/or FIG. 4A have the same reference numerals in FIG. 4B.

In comparison to FIG. 4A, FIG. 4B illustrates an example where network traffic, after being parsed by parser 404-2 is redirected to a CDFW of another cloud-accessible controller such as CDFW 458-1 or CDFW 458-2 of controller 452. Controller 452 may also be referred to as a backup controller at a backup data center.

Architecture 450 of FIG. 4B illustrates two example controllers 302 and 452 that are cloud-accessible and remotely connected with similar components and functionalities. For example, remote access headend 454 may be the same or similar to remote access headend 402, headend 456, encryption/decryption component 456-1, and parser 456-2 may be the same as or similar to headend 404, encryption/decryption component 404-1, and parser 404-2, respectively.

Furthermore, router 455 may be the same as or similar to router 406, CDFWs 458-1 and 458-2 may be the same as or similar to CDFWs 408-1 and 408-2, and database 460 may be the same as or similar to database 410. Lastly, while not shown in FIG. 4B, there may be different group of remotely connected devices similar to devices 304 and 401 that may be directly and remotely connected to controller 452.

As noted above, when network traffic comes in from, for example, user device 401 at controller 302, parser 404-2, per the process described above with reference to FIG. 4A, may parse the data packets and extract metadata indicating, among other things, the type of service to be applied to the network traffic. Upon sharing this metadata with router 406, router 406 may determine that while the network traffic is to be serviced by CDFWs at controller 302, CDFWs 408-1, 408-2, and/or any other operational CDFW inside controller 302 may be operating at capacity. Router 406 may be communicatively coupled to router 455 and thus may identify available CDFW services at controller 452 such as CDFW 458-1 or 458-2 that are more suited (i.e., with available capacity) for servicing the network traffic. Accordingly, router 406 may either directly route the network traffic to CDFW 458-1 or CDFW 458-2 for servicing or may signal the user device (via the corresponding one of headends 402 and 404) to send network traffic to controller 452 and more specifically to CDFW 458-1 or 458-2 for servicing. In one example, router 406 may determine that for a determined period of time, CDFWs at controller 302 may be running at capacity and thus any network traffic received from a user device 304 or 401 should be directed to a CDFW inside controller 452 for servicing. Accordingly, instead of waiting for network traffic to be received at controller 302, parsed and then redirected to a CDFW inside controller 452, on a per flow basis, controller 302 (and more specifically router 406) may send a signal to the user device 304 or 401 from which the network traffic is received to send future traffic directly to controller 452 (e.g., via remote access headend 454 as shown in FIG. 4B or similarly through headend 456 if network traffic originates from a user device 401) for the determined period of time.

Architecture 450 may also include a central capacity management component 462 (may also be referred to as capacity controller). In one example and instead of a direct coordination between routers of different controllers such as router 406 of controller 302 and router 455 of controller 452, capacity controller 462 may monitor and perform load balancing between CDFWs inside different controllers such as between CDFWs of controllers 302 and 452 as described above. Such capacity controller 462 may operate as an overlay controller coordinating among all controllers.

While FIG. 4B is described with reference to two example controllers, the present disclosure is not limited thereto. Architecture 450 may include three or more remotely connected and cloud accessible controllers (datacenters) similar to controllers 302 and 452 at each of which incoming data packets may be parsed and load-balanced for servicing among different components at different controllers.

Figure 5A:
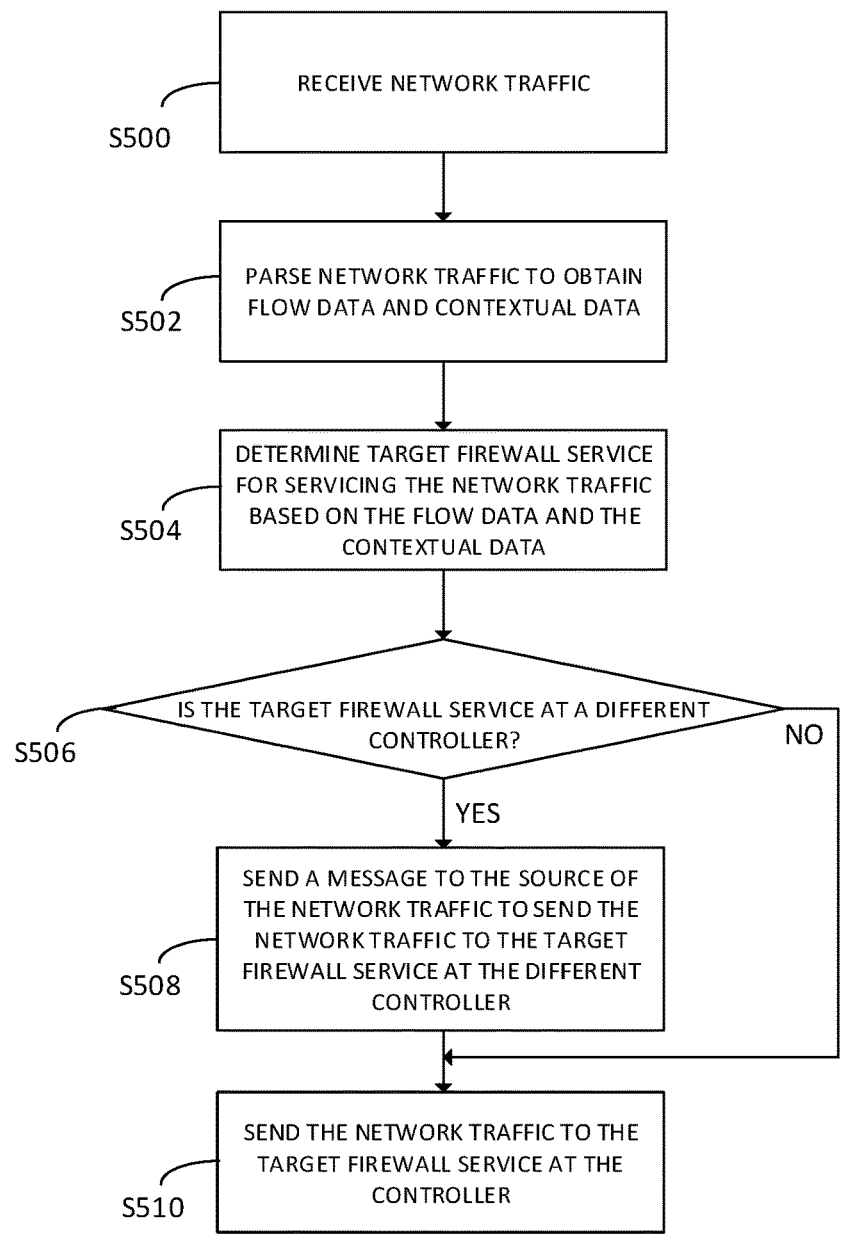
FIG. 5A illustrates an example method of flow parsing and load balancing in an environment utilizing a SASE architecture, according to some aspects of the present disclosure.
Figure 6:
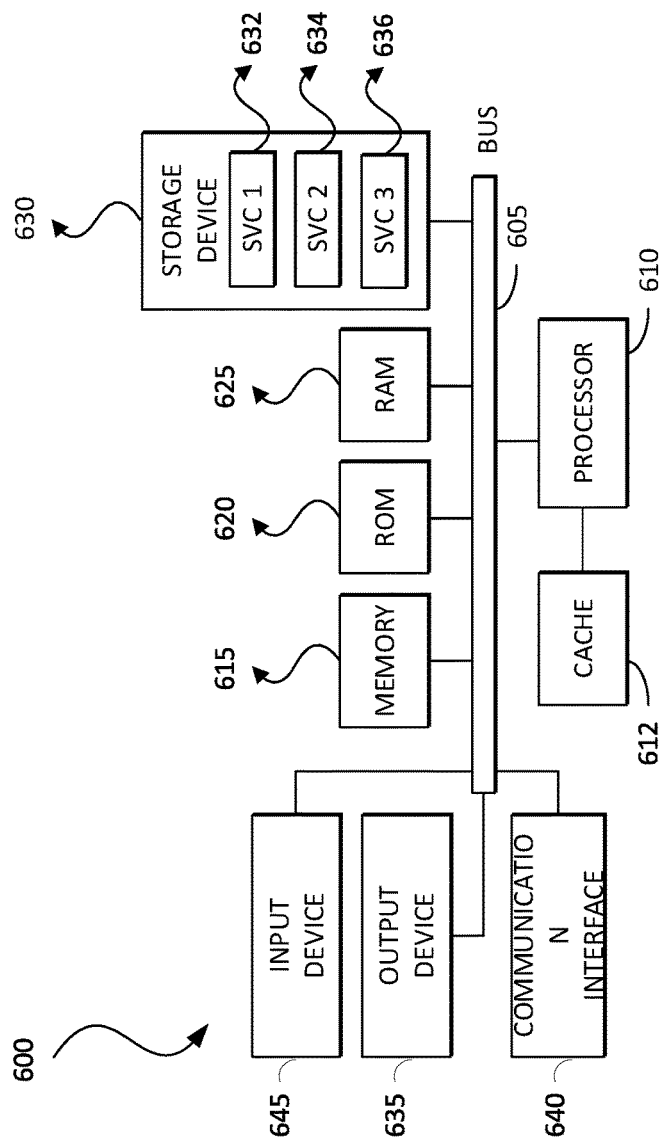
FIG. 6 illustrates an example computing system architecture, according to some aspects of the present disclosure.

FIG. 5A illustrates an example method of flow parsing and load balancing in an environment utilizing a SASE architecture, according to some aspects of the present disclosure. FIG. 5A will be described from the perspective of controller 302. However, it will be understood that computer-readable instructions stored on one or more memories may be executed by one or more processors (e.g., residing on cloud-accessible servers) to implement functionalities of various components of controller 302, as described above, to perform steps of the process of FIG. 5A described below.

At S500, controller 302 receives network traffic from a user device. As noted above, such user traffic may originate from a remotely connected user device such as user device 304, a user device 401, etc.

At S502, controller 302 parses the received network traffic as described above with reference to FIGS. 4A and 4B to extract flow data and contextual data (also referred to as metadata in describing FIGS. 4A-B). In one example, parser 404-2, after decryption of the network traffic via encryption/decryption component 404-1 at headend 404, may parse the network traffic. As described above, flow data can include, but is not limited to, a source IP address of the user device from which network traffic is received, a source port, a destination IP address for the network traffic, a destination port, and a protocol type associated with the network traffic. In some examples, contextual data can include, but is not limited to, a class of services associated with the user device from which the network traffic is received, an origin of packets in the received network traffic, and a tunnel ID associated with the network traffic.

At S504 and based on the contextual data and/or the flow data, controller 302 may determine a target firewall service (e.g., one of CDFWs 408-1, 408-2, 458-1, and/or 458-2) for servicing the network traffic. This process may be performed as described above with reference to FIGS. 4A and 4B.

At S506, controller 302 may determine if the target firewall service determined at S504 is at a different controller (e.g., at controller 452 described above with reference to FIG. 4B). If the target firewall service is at a different controller, then at S508, controller 302 may send a signal to the user device from which the network traffic is received at S500, to direct the network traffic to the different controller and more specifically to a firewall service at the different controller (e.g., CDFW 548-1 at controller 452).

In some examples and as noted above, controller 302 may determine that for a period of time, network traffic from the user device (e.g., user device 401) should be serviced by CDFW 548-1 at controller 452. In this instance, the message at S506 may be that, for the period of time, all network traffic from the user device be directly sent from the user device to a corresponding headend (e.g., headend 456) at controller 452. The duration of the period of time during which network traffic from the user device should be sent to controller 452, may be configurable and determined based on experiments and/or empirical studies. In one instance, the period of time may be determined based on an estimated/forecasted utilization of CDFWs at controller 302, the amount of incoming traffic to controller 302, etc.

Referring to S506, if controller 302 determines that the target firewall service is not at a different controller but instead is a CDFW at controller 302 (e.g., CDFW 508-1 or 508-2), then at S510, controller 302 directs the network traffic received at S500 to the target CDFW at controller 302 for further processing.

While the process of FIG. 5A is described from the perspective of controller 302, it should be apparent to those skilled in the art that controller 302 has several components (e.g., as described above with reference to FIGS. 4A and 4B), each of which may perform any one or more of steps of FIG. 5A. Furthermore, process of FIG. 5A can be similarly performed by capacity controller 462 of FIG. 4B, which will be described next with reference to FIG. 5B.

Figure 5B:
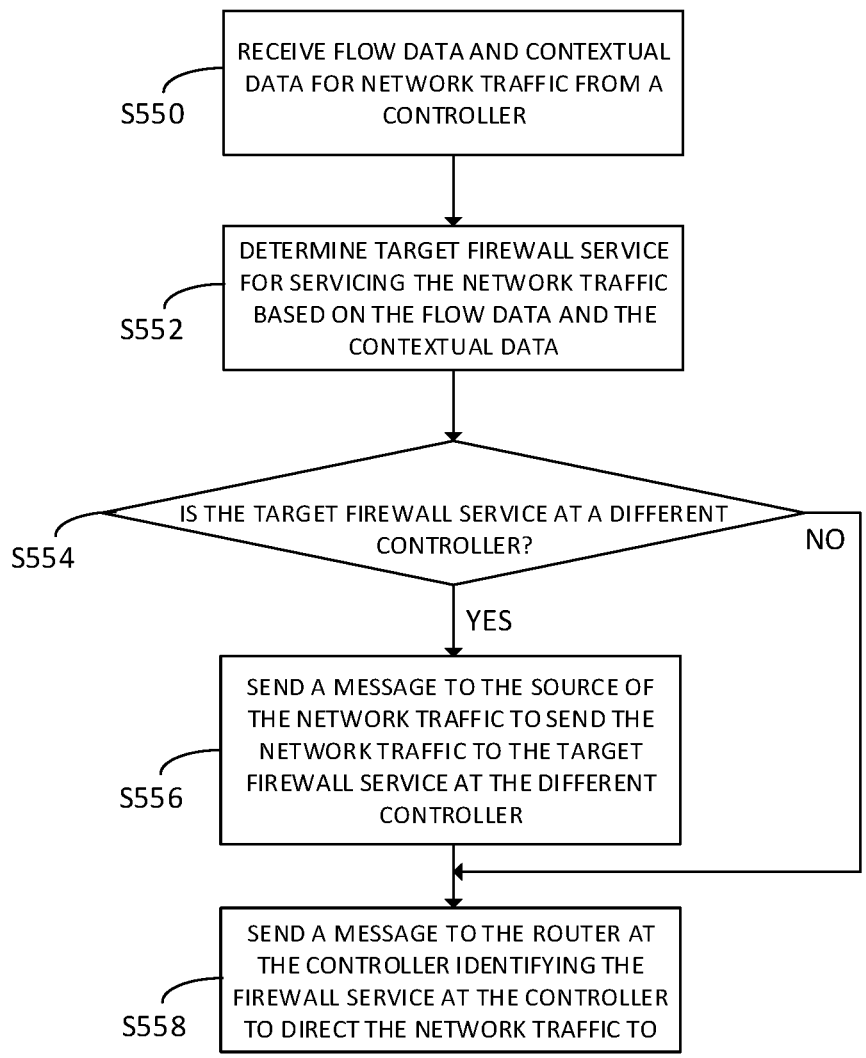
FIG. 5B illustrates an example method of flow parsing and load balancing in an environment utilizing a SASE architecture, according to some aspects of the present disclosure.

FIG. 5B illustrates an example method of flow parsing and load balancing in an environment utilizing a SASE architecture, according to some aspects of the present disclosure. FIG. 5B will be described from the perspective of capacity controller 462 of FIG. 4B. However, it will be understood that computer-readable instructions stored on one or more memories may be executed by one or more processors (e.g., residing on cloud-accessible servers) to implement functionalities of various components of capacity controller 462, as described above, to perform steps of the process of FIG. 5B described below.

At S550, capacity controller 462 may receive information about network traffic from a particular controller (e.g., controller 302 or controller 452, which may also be referred to as a network controller). The information may include flow data and contextual data as described above, which may have been obtained by the respective controller after parsing the network traffic.

At S552, capacity controller 462 determines a target firewall service for servicing the network traffic using the flow data and the contextual data. This step may be performed in the same manner as S504 of FIG. 5A and hence will not be further described.

Thereafter, S554 and S556 may be performed by controller 462 in the same manner as S506 and S508 of FIG. 5A and hence will not be further described.

At S558 and after capacity controller 462 determines that the network traffic should be serviced by a CDFW at the same controller from which the information is received at S550 (e.g., controller 302), capacity controller 462 may send a message to the router at the same controller (e.g., router 406) identifying the target CDFW (e.g., CDFW 408-1 and/or CDFW 408-2) for servicing the network traffic. In response to this message, router 406 may send the network traffic from the user device (e.g., user device 401) to the identified target CDFW.

By implementing the process of FIGS. 5A-B, the present disclosure provides a solution for improving and optimizing cloud resource utilization in a SASE environment. This non-limiting solution enables the parsing of incoming flow of network traffic to route the network traffic more efficiently to an intended destination in the SASE environment before eventually routing the same to an external service.

With example systems and methods for managing network traffic in a SASE environment described with reference to FIGS. 1-5, the disclosure now turns to description of system architecture and devices that can be utilized as components of controller 302, controller 452, capacity controller 462 or any other component described above with reference to FIGS. 1-5A-B.

FIG. 6 illustrates a computing system architecture, according to some aspects of the present disclosure. Components of computing system architecture 600 are in electrical communication with each other using a connection 605, such as a bus. Exemplary system 600 includes a processing unit (CPU or processor) 610 and a system connection 605 that couples various system components including the system memory 615, such as read only memory (ROM) 620 and random access memory (RAM) 625, to the processor 610. The system 600 can include a cache 612 of high-speed memory connected directly with, in close proximity to, or integrated as part of the processor 610. The system 600 can copy data from the memory 615 and/or the storage device 630 to the cache 612 for quick access by the processor 610. In this way, the cache 612 can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service (SVC) 1 632, service (SVC) 2 634, and service (SVC) 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

FIG. 7 illustrates an example network device, according to some aspects of the present disclosure. Example network device 700 can be suitable for performing switching, routing, load balancing, and other networking operations. Network device 700 includes a central processing unit (CPU) 704, interfaces 702, and a bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications-intensive tasks, these interfaces allow the master CPU 704 to efficiently perform routing computations, network diagnostics, security functions, etc.

Although the system shown in FIG. 7 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the bus 710, to exchange data and signals and coordinate various types of operations by the network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A cloud-based secure service system comprising:
   a network controller configured to:
   receive network traffic from one or more user devices remotely connected to the network controller;
   parse the network traffic into flow data and contextual information associated with the network traffic;
   determine a location of a target firewall service at the cloud-based secure service system for servicing the network traffic based on the flow data and the contextual information; and
   direct the network traffic to the target firewall service to be serviced.

2. The cloud-based secure service system of claim 1, wherein the network controller is configured to determine the location of the target firewall service based on available processing capacity of a plurality of firewall services.

3. The cloud-based secure service system of claim 1, wherein the flow data includes a source IP address, a source port, a destination IP address, a destination port, and a protocol type associated with the network traffic.

4. The cloud-based secure service system of claim 1, wherein the contextual information includes a class of services, an origin of packets in the network traffic, and a tunnel ID associated with the network traffic.

5. The cloud-based secure service system of claim 1, wherein the target firewall service is at a backup data center that is different than a data center in which the network controller is located.

6. The cloud-based secure service system of claim 5, wherein the network controller is further configured to transmit a message including the flow data and the contextual information to a corresponding one of the one or more user devices to redirect associated outgoing traffic to the backup data center for processing.

7. The cloud-based secure service system of claim 1, wherein the network controller comprises a headend component that is configured to receive the network traffic.

8. The cloud-based secure service system of claim 7, wherein the headend component comprises a flow parser module configured to parse the network traffic, the flow parser being inside the headend component and between an encryption/decryption module and a routing component of the cloud-based secure service system.

9. A method comprising:
receiving, at a network controller of a cloud-based secure service system, network traffic from one or more user devices remotely connected to the network controller;
parsing, by the network controller, the network traffic into flow data and contextual information associated with the network traffic;
determining, by the network controller, a location of a target firewall service at the cloud-based secure service system for servicing the network traffic based on the flow data and the contextual information; and
directing, by the network controller, the network traffic to the target firewall service to be serviced.

10. The method of claim 9, wherein the location of the target firewall service is determined based on available processing capacity of a plurality of firewall services.

11. The method of claim 9, wherein the flow data includes a source IP address, a source port, a destination IP address, a destination port, and a protocol type associated with the network traffic.

12. The method of claim 9, wherein the contextual information includes a class of services, an origin of packets in the network traffic, and a tunnel ID associated with the network traffic.

13. The method of claim 9, wherein the target firewall service is at a backup data center that is different than a data center in which the network controller is located.

14. The method of claim 13, further comprising:
transmitting, by the network controller, a message including the flow data and the contextual information to a corresponding one of the one or more user devices to redirect associated outgoing traffic to the backup data center for processing.

15. The method of claim 9, wherein the network controller comprises a headend component for receiving the network traffic.

16. The method of claim 15, wherein the headend component comprises a flow parser for parsing the network traffic, the flow parser being inside the headend component and between an encryption/decryption module and a routing component of the cloud-based secure service system.

17. One or more non-transitory computer-readable media comprising computer-readable instructions, which when executed by one or more processors at a network controller of a cloud-based secure service system, cause the network controller to:
receive network traffic from one or more user devices remotely connected to the network controller;
parse the network traffic into flow data and contextual information associated with the network traffic;
determine a location of a target firewall service at the cloud-based secure service system for servicing the network traffic based on the flow data and the contextual information; and
direct the network traffic to the target firewall service to be serviced.

18. The one or more non-transitory computer-readable media of claim 17, wherein
the flow data includes a source IP address, a source port, a destination IP address, a destination port, and a protocol type associated with the network traffic; and
the contextual information includes a class of services, an origin of packets in the network traffic, and a tunnel ID associated with the network traffic.

19. The one or more non-transitory computer-readable media of claim 17, wherein the network controller comprises a headend component that is configured to receive the network traffic.

20. The one or more non-transitory computer-readable media of claim 19, wherein the headend component comprises a flow parser module configured to parse the network traffic, the flow parser being inside the headend component and between an encryption/decryption module and a routing component of the cloud-based secure service system.

* * * * *